United States Patent
Duvvuri

[15] 3,685,611
[45] Aug. 22, 1972

[54] DUCT WITH LINING OF SPACED BANDS FOR SUPPRESSING SOUND IN A GAS STEAM TRANSMITTED THERETHROUGH

[72] Inventor: Tirumalesa Duvvuri, Chula Vista, Calif.

[73] Assignee: Rohr Corporation, Chula Vista, Calif.

[22] Filed: March 24, 1971

[21] Appl. No.: 127,511

[52] U.S. Cl............181/33 H, 181/50, 181/63, 181/69, 239/265.11
[51] Int. Cl..........B64d 33/06, F01n 1/08, F02k 1/26
[58] Field of Search.....181/33 R, 33 HA, 33 HB, 33 HC, 181/42, 50, 63, 69, 68; 239/265.11, 265.15, 265.19

[56] References Cited

UNITED STATES PATENTS

| | | | |
|---|---|---|---|
| 2,798,569 | 7/1957 | Fischer | 181/33 HB |
| 2,823,756 | 2/1958 | Bridge et al. | 181/33 HA |
| 2,930,195 | 3/1960 | Blockman et al. | 181/33 HB |
| 2,988,302 | 6/1961 | Smith | 181/33 HA |
| 3,286,787 | 11/1966 | Wirt | 181/50 X |
| 3,439,774 | 4/1969 | Callaway et al. | 181/42 |
| 3,477,231 | 11/1969 | Paulson | 181/33 HB |

FOREIGN PATENTS OR APPLICATIONS

| | | | |
|---|---|---|---|
| 1,513,952 | 1/1968 | France | 181/50 |

*Primary Examiner*—Robert S. Ward, Jr.
*Attorney*—George E. Pearson

[57] ABSTRACT

For suppressing sound transmitted through gases traveling at high velocity through a duct, such as the air inlet or exhaust duct of an aircraft jet engine, the duct is lined with a plurality of bands extending traversely around the interior of the duct wall, the bands being spaced inwardly from the duct wall and axially of the duct from each other.

2 Claims, 4 Drawing Figures

PATENTED AUG 22 1972          3,685,611

INVENTOR.
TIRUMALESA DUVVURI
BY
ATTORNEY

DUCT WITH LINING OF SPACED BANDS FOR SUPPRESSING SOUND IN A GAS STEAM TRANSMITTED THERETHROUGH

BACKGROUND OF THE INVENTION

Numerous attempts have been made in the past to attenuate high energy sound waves being transmitted in air or other gases flowing through a duct, as in forced air heating and air conditioning systems, and in other ducts and passages such as those within an aircraft jet engine, either ahead of or aft of the compressor among such prior attempts at sound suppression are the well known honeycomb panel with perforated facing sheet, felt metal, and others. While these prior duct lining materials and methods are of varying effectiveness, some installations are difficult to clean, require sophisticated and relatively expensive manufacturing procedures, and are of varying effectiveness.

SUMMARY OF THE INVENTION

A primary objective of the invention is to provide a sound suppressing lining for an air or gas transmitting duct, which lining comprises a plurality of annular bands, spaced apart axially of the duct, and inwardly from the duct wall to provide slot-like gaps between adjacent bands, and to form resonant chambers between the bands and the duct wall, whereby sound waves impinging on the alternate band-slot lining are variously reflected, refracted, develop interference with existing sound waves, are changed in frequency, and are transformed into heat.

While intended primarily for use in the air inlet duct of an aircraft jet engine the invention also may be used in the exhaust zone, and for other sues where excess noise in an air or gas transmitting duct is a problem.

BRIEF DESCRIPTION OF THE DRAWINGS

The foregoing and other objectives and advantages of the invention will be apparent from the following description and the accompanying drawings, wherein.

DETAILED DESCRIPTION OF THE DRAWINGS

Figure 1:
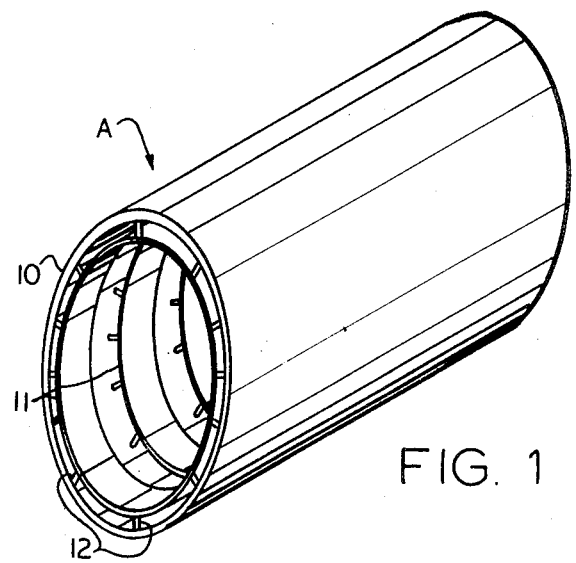
FIG. 1 is a perspective view showing somewhat diagrammatically a length of air inlet duct for an aircraft jet engine with one form of the invention embodied therein.

Referring to the drawings in detail, a duct A, which may be an air inlet duct for an aircraft jet engine, comprises a duct wall 10 of suitable, selected material, such as sheet aluminum or titanium, sound absorptive honeycomb panel, felt metal or other suitable material. A selected number of axially spaced annular bands 11, each corresponding generally to the internal cross sectional shape of the duct wall 10, but of smaller diameter, are mounted securely, co-axially within the duct A and in inwardly spaced relation to the duct wall 10. The bands 11 in FIG. 1 are shown supported by posts 12, which are secured, as by welding, to the bands 11 and to the duct wall 10.

Figure 2:
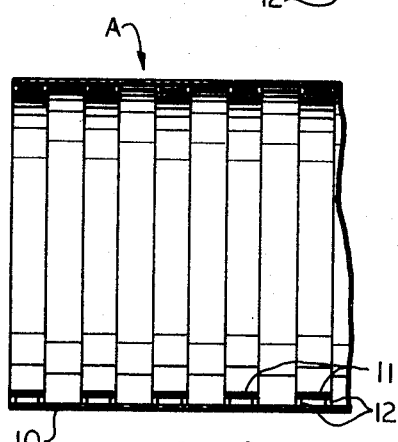
FIG. 2 is an enlarged, fragmentary diametrical sectional view of one end portion of the duct of FIG. 1.
Figure 3:
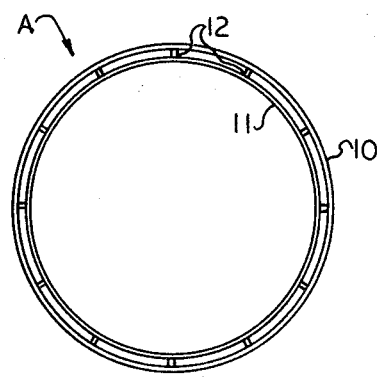
FIG. 3 is an end view of the duct as shown in FIG. 2.
Figure 4:
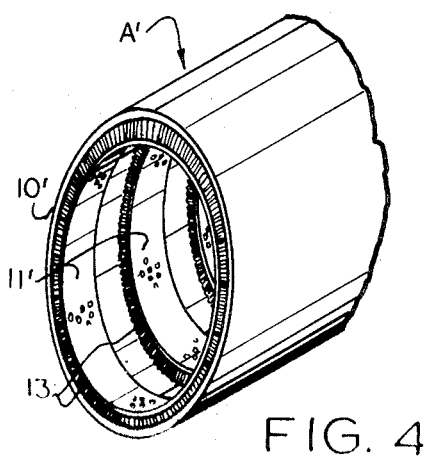
FIG. 4 is a fragmentary perspective view showing an end portion of a duct lined with spaced, annular bands supported on annular bases of honeycomb core material.

In the modified form of the invention shown in FIG. 4 a duct A' has mounted therein a plurality of axially spaced bands 11', which may be generally similar to those 11 of FIGS. 1 – 3 with the exception that they are perforated throughout at least a large portion of their respective areas. Each band 11' is supported on an annular base 13 of conventional honeycomb core material. The honeycomb base 13 is fitted into and fixedly secured to duct wall 10' as by brazing or suitable adhesive, and the band 11' is fitted into and secured to the base 13 in similar manner.

The material of which the bands 11 or 11' are made, their thickness, the shape of their edges, i.e., curved, square, beveled, etc. the width of the bands, and their spacing from the duct wall 10 and 10' and from each other, as well as the material comprising the duct walls 10 and 10', bands 11 and 11', and the band support structure all affect not only the sound absorptive effect of the duct lining, but also the restrictive effect of the lining on the flow of air or other gases through the duct. All of the foregoing factors, are, therefore, carefully considered in designing a sound attenuating duct lining for each installation embodying the invention. As yet, however, insufficient test data has been accumulated to permit specification of these various details for optimum sound suppressing and stream flow performance.

Other factors to be considered in designing a duct embodying the invention are, the size and relation of alternate band and slot areas of the lining, the shear, reflection and refractive effects of the band edges and other components on the sound, the resonant chamber effect of the space between each band 11 or 11' and the duct wall 10 and 10' outwardly thereof, as well as the type of gas being transmitted through the duct, its velocity, noise characteristics, i.e., broad band and pure tone components, and other known or ascertainable factors. Thus, lining embodying the invention can be designed to have optimum sound attenuating effect for any known set of conditions by controlling interference and absorptive effects of the various elements of each installation embodying the invention.

The invention comprises a simple, rugged, easily cleaned sound attenuating duct lining which can be installed in retrofit and has no moving parts.

Having thus described my invention, what I claim as new and useful and desire to protect by U. S. Letters Patent is:

I claim:

1. A sound attenuating duct structure for transmitting a stream of air or other gases, through which stream high energy sound is being transmitted, said duct comprising, a duct wall shaped to contain and direct such stream, a plurality of sound attenuating duct lining bands of sheet material mounted interiorly of the duct wall, each band being spaced axially of the duct wall from adjacent ones of said bands, each band being of annular shape corresponding substantially to the cross sectional shape of the duct wall, and of smaller diameter, and means firmly supporting each band substantially co-axially within, and spaced inwardly from, the duct wall, said support means comprises an annular strip of honeycomb core fitted into the duct wall, one of the bands, perforated throughout a substantial area thereof fitted into each honeycomb core base, and means fixedly securing each honeycomb core base to the duct wall and to the band fitted interiorly thereof.

2. A sound attenuating duct as claimed in claim 1 wherein the means supporting each band comprises a plurality of support elements extending at circumferentially spaced intervals between each band and the duct wall spaced outwardly therefrom, each support element fixedly secured to the band which it supports and to the duct wall.

* * * * *